May 9, 1950 A. A. KLINGBIEL 2,506,928
PIECRUST SHAPER
Filed Feb. 15, 1949
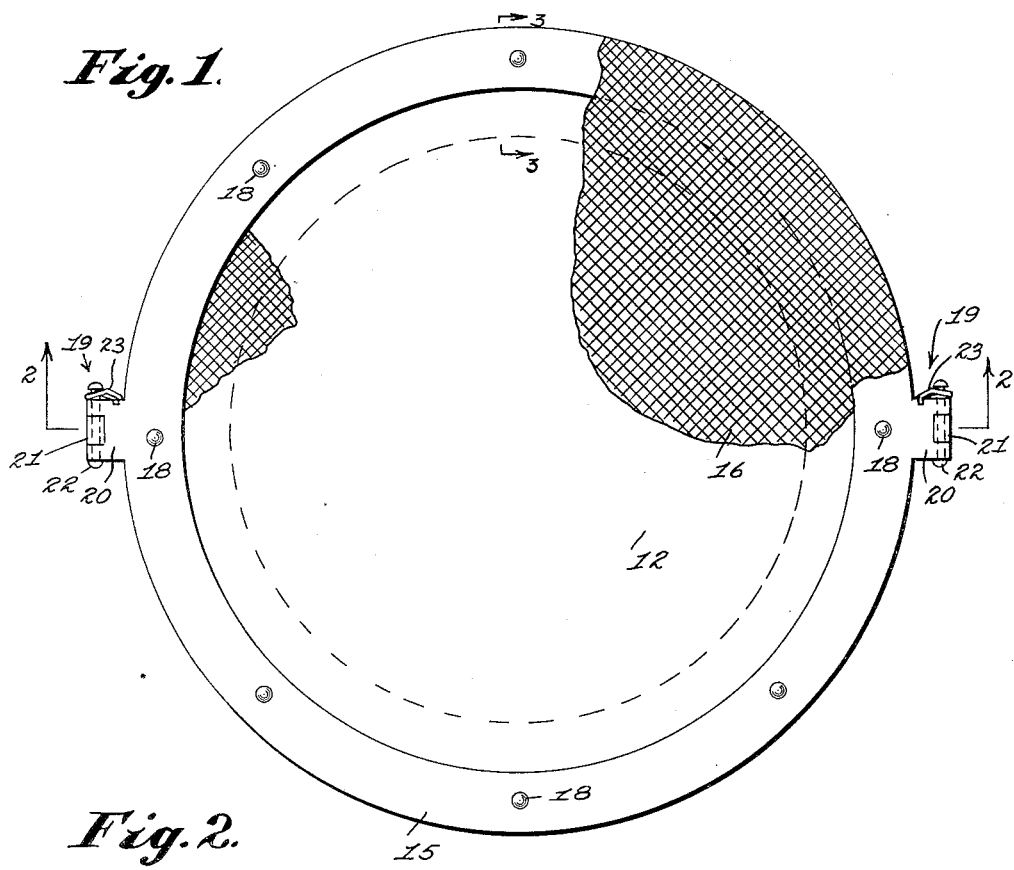
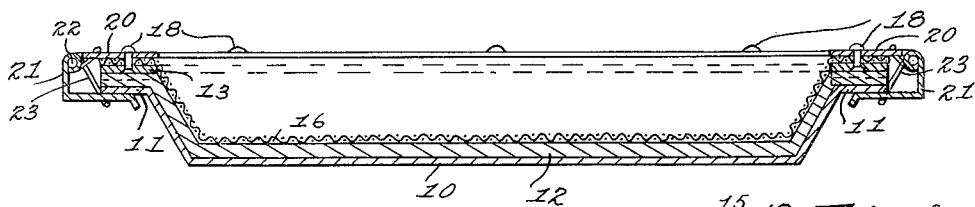
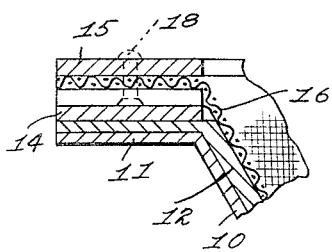
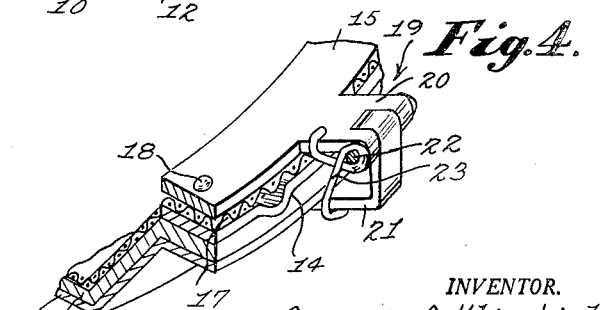
INVENTOR.
Augusta A. Klingbiel
BY
Wilfred E. Lawson
ATTORNEY Patented May 9, 1950

2,506,928

UNITED STATES PATENT OFFICE 2,506,928

PIECRUST SHAPER

Augusta A. Klingbiel, Los Angeles, Calif.

Application February 15, 1949, Serial No. 76,450

1 Claim. (Cl. 99—433)

This invention relates to cooking equipment, and more particularly to a device for shaping pie crust shells.

The object of the invention is to provide a pie crust shell shaper which will enable the user to observe the pie crust during the baking thereof to thereby insure that the pie crust shell will be perfectly baked.

Another object of the invention is to provide a pie crust shell shaper embodying a reticulated support member through which the user can observe the progress of the pie crust shell during the baking thereof to thereby prevent under baking or over baking of same.

Still another object of the invention is to provide a pie crust shell shaping device which will insure that the pie crust shell has an even thickness and which will prevent warping and blistering of the crust during the baking process.

Another object of the invention is to provide a pie crust shell shaper which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the pie shell shaper, with parts broken away and in section, according to the present invention;

Figure 2 is a sectional view taken on the line 2—2 of Figure 1, and showing the shaper attached to a pie pan;

Figure 3 is an enlarged sectional view taken on the line 3—3 of Figure 1; and

Figure 4 is a perspective view of one of the latches.

Referring in detail to the drawings, the nueral 10 designates a pie pan, Figures 2 and 4. The pie pan 10 is conventional and includes a central indented portion and an annular flange 11, the pie pan 10 serving to support therein a pie crust shell 12 to be baked.

The device of the present invention is to insure that the pie crust 12 will be properly baked, and the shaping device comprises a first ring or annular rim 13 which has a plurality of radially disposed spaced projections 14 depending from the undersurface thereof, the projections 14 serving to make suitable indentations in the pie crust. Arranged in spaced relation above the rim 13 is a second rim or ring 15. A reticulated support member 16 embodying a wire mesh screen has the same configuration as the pie pan 10 and the reticulated member 16 has its peripheral edge 17 interposed between the first rim 13 and the second rim 15. A plurality of spaced securing elements, such as rivets 18, project through the rim 15, through the outer portion 17 of the reticulated member, and through the rim 13 for maintaining the parts in assembled relation.

The shaping device is provided with a pair of opposed latches 19 for detachably connecting the shaper to the pie pan 10. Each of the latches 19 comprises an ear 20 which may be formed integral with or secured to the upper rim 15. An arm 21 is hingedly connected to each of the ears 20 by means of a pin 22, and a suitable spring 23 normally urges the arm 21 into engagement with the bottom rim 13 to prevent accidental dislodgment of the shaper from the pie pan.

In use, the pie crust 12 to be baked is positioned or supported in the pie pan 10, and the pie shaper is then arranged on top of the pie crust 12 as shown in Figure 2. The latches or fasteners 19 are positioned so that the shaper will remain connected to the pie pan 10. The shaper includes the reticulated member 16 whereby the user can readily observe the pie crust shell 12 during the baking thereof to insure that the pie crust shell will not be over baked or under baked. Thus, the user is able to readily observe the pie crust shell 12 and the shell crust will be properly baked even though the user does not have an oven equipped with a regulator. The crust can be baked to the desired brownness or lightness. The shaping device is especially useful for baking single crust pies wherein the crust is to be later filled.

While I have shown and described a preferred embodiment of my invention, this is by way of illustration only and I consider as my own all such modifications in construction as fairly fall within the scope of the appended claim.

I claim:

A pie shell shaper comprising an annular rim provided with a plurality of spaced radially extending projections, a second rim arranged in spaced parallel relation above said first rim, a wire screen having its peripheral edge interposed between said first and second rims, a plurality of securing elements projecting through said first rim, wire screen and second rim for maintaining the parts in assembled relation, and a pair of opposed latches secured to said second rim for detachably connecting said shaper to a pie pan.

AUGUSTA A. KLINGBIEL.

(References on following page)

REFERENCES CITED

The following references are of record in the file of this patent:

UNITED STATES PATENTS

| Number | Name | Date |
|---|---|---|
| 823,216 | Haddock | June 12, 1906 |
| 843,109 | Sabin | Feb. 5, 1907 |
| 1,411,128 | Storbhart | Mar. 28, 1922 |
| 1,938,572 | Agey | Dec. 12, 1933 |
| 2,082,973 | Prabell | June 8, 1937 |

FOREIGN PATENTS

| Number | Country | Date |
|---|---|---|
| 46,364 | Denmark | Oct. 13, 1932 |